Dec. 15, 1959 B. WILSON 2,917,718
FREQUENCY MODULATED SERIES TUBE PHASE SHIFT OSCILLATOR
Filed May 28, 1957
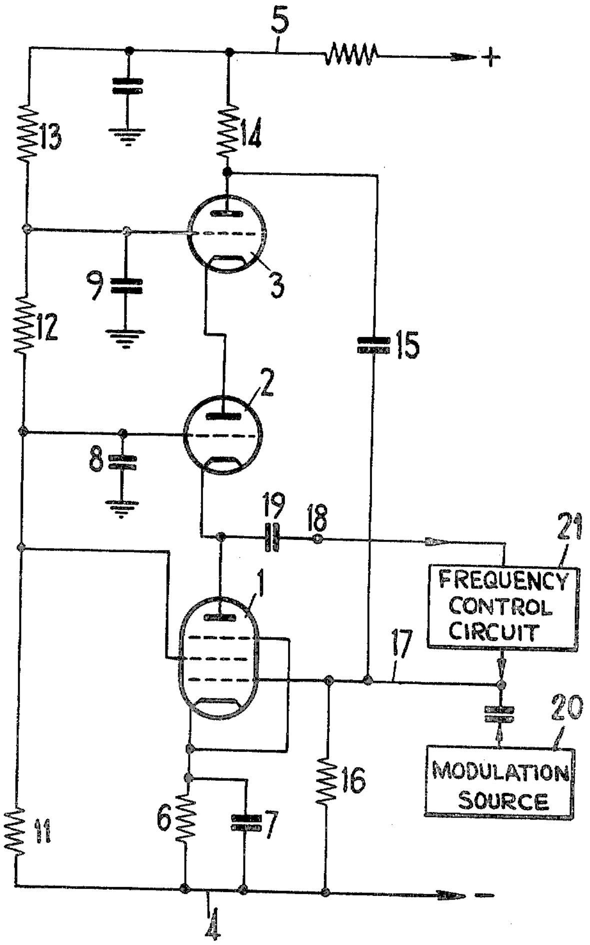
INVENTOR
BERNARD WILSON
BY
ATTORNEYS United States Patent Office 2,917,718
Patented Dec. 15, 1959

2,917,718

FREQUENCY MODULATED SERIES TUBE PHASE SHIFT OSCILLATOR

Bernard Wilson, Wyken, Coventry, England, assignor to The General Electric Company Limited, London, England Application May 28, 1957, Serial No. 662,078

Claims priority, application Great Britain May 28, 1956

4 Claims. (Cl. 332—27)

This invention relates to electric oscillators.

In the Post Office Electrical Engineers' Journal, volume 48, part II, there is described on page 109, with particular reference to Figure 2, a frequency modulated oscillator that comprises a pentode thermionic valve arranged as a grounded-cathode valve and two triode valves each arranged as a grounded-grid valve. The input impedance of each of the grounded grid stages is a complex impedance depending upon the mutual conductance of the triode valve of that stage and the total capacitance (including interelectrode capacitance of the valve) between the control grid and cathode of the valve and value of this complex impedance determines the phase-shift of the preceding stage. By varying the bias applied to the control grids of the two triode valves, the mutual conductance of each of these valves is varied thereby changing the operating frequency of the oscillator. In fact the input modulation signal is fed to the control grids of the two triode valves and this has the effect of frequency modulating the oscillator.

One object of the present invention is to provide an improved oscillator which operates in the same general manner as the oscillator referred to above.

According to the present invention, an electric oscillator comprises in combination a grid-controlled thermionic valve arranged as a grounded-cathode stage and two or more grid-controlled thermionic valves each arranged as a grounded-grid stage, all the said stages being connected in a closed loop so that, during operation, the phase-shift round the loop at the frequency of operation is such that the combination is self oscillatory while the anode-cathode discharge paths of the said valves are series-connected, the arrangement being such that, during operation, the frequency of the oscillations supplied by the oscillator is varied by controlling the current through at least the said valves which are arranged as grounded-grid stages.

The oscillator frequency may be controlled in the manner stated for the purpose of effecting automatic frequency control of the oscillator and/or so as to effect frequency modulation. The automatic frequency control signal and/or modulation signal may be utilised to control the current through all the said valves, for example by being supplied to the control grid of the valve of the grounded-cathode stage. It is to be understood however that the same value of current need not flow through all the said valves. Thus a further valve may be connected in parallel with the said valve of the grounded-cathode stage as far as their anode currents are concerned, the modulation signal being supplied to the control grid of this further valve which does not form part of the closed loop.

One construction of an oscillator in accordance with the present invention will now be described by way of example with reference to the accompanying drawing which shows diagrammatically the circuit of the oscillator. The operating frequency of the oscillator is in the region of 60 megacycles per second.

Referring to the drawing, the oscillator comprises a pentode thermionic valve 1 and two triode thermionic valves 2 and 3, the anode of the valve 1 being connected directly to the cathode of the valve 2 while the anode of the valve 2 is connected directly to the cathode of the valve 3. The anode-cathode discharge paths of the three valves 1, 2 and 3 are thus connected in series between a negative supply line 4 and a positive supply line 5. In fact a bias resistor 6 and a by-pass capacitor 7 are connected in parallel between the cathode of the valve 1 and the supply line 4 which, since it is maintained at a fixed voltage, effectively has a low radio frequency impedance to earth. The valve 1 is thus arranged as a grounded-cathode stage. Capacitors 8 and 9 are connected between the control grids of the triode valves 2 and 3 respectively so that these two valves are arranged as grounded-grid stages.

Bias voltages to the control grids of the valves 2 and 3 and to the screen grid of the valve 1 are supplied by a potentiometer which is formed by three resistors 11, 12 and 13 and which is connected between the supply lines 4 and 5. In order to complete the oscillator loop, resistance-capacitance coupling is provided between the valve 3 and the control grid of the valve 1 by a resistor 14 and a capacitor 15, a resistor 16 being connected between the control grid of the valve 1 and the negative supply line 4.

During operation of the oscillator, the grounded-cathode stage including the pentode valve 1 introduces a phase-shift of 180° plus a phase-shift due to the fact that the valve 1 has as its anode load impedance, the complex impedance provided by the input impedance of the grounded-grid stage including the triode valve 2. The stage including the valve 2 similarly introduces a phase-shift due to the fact that its anode load is formed by the input impedance to the stage including the valve 3. The oscillatory voltage developed at the anode of the valve 3 is substantially in phase with the oscillatory voltage applied to its cathode but the capacitor 15 and resistor 16 form a phase-shift network with the result that there is a phase-shift in the oscillatory voltage applied to the control grid of the valve 1. The oscillator operates at the frequency at which the phase-shift round this loop adds up to 360° and the frequency of operation is varied by changing the current through the valves 2 and 3 thereby effecting the mutual conductance of those valves and thus the complex load impedance presented to the valves 1 and 2.

The oscillator output may be taken from any point of the said loop. For example the output terminal 18 may be loosely coupled through a capacitor 19 to the anode of the valve 1 as shown in the drawing, or alternatively, it may be similarly coupled to the anode of the valve 3.

The frequency at which the oscillator operates is determined by the current through the valves 2 and 3, this being controlled by the signal supplied to the control grid of the pentode valve 1 over the path 17. This signal consists of a modulation component for the purpose of frequency modulating the oscillator together with a steady voltage which determines the mean operating frequency of the oscillator. The modulation component is supplied by a source 20 while the steady voltage may, as shown, be supplied by an automatic frequency control circuit 21.

It is found that triode valves do not usually have a linear anode current/mutual conductance characteristic. It is however desirable for the frequency deviation of an oscillator from its mean frequency to be directly proportional to the instantaneous amplitude of the modulation component supplied over the path 17 and the pentode valve 1 may be biassed so that its characteristic tends to compensate for the non-linear anode current/mutual conductance characteristics of the valves 2 and 3.

I claim:

1. An electric oscillator comprising first, second and third thermionic valves each having an anode, a cathode and a control grid, means to maintain the control grid of the second valve at earth potential, means to maintain the control grid of the third valve at earth potential, positive and negative supply lines, an electric path which connects said negative supply line to the cathode of said first valve and which presents a relatively low impedance at the frequency of operation of the oscillator, an electric path which connects the anode of said first valve to the cathode of said second valve, an electric path which connects the anode of said second valve to the cathode of said third valve, a purely resistive impedance connected directly between the anode of said third valve and said positive supply line, a capacitive coupling between the anode of said third valve and the grid of said first valve which coupling completes a closed loop so that during operation the cumulative phase-shift around the loop at the frequency of operation is such that the combination is self oscillatory, and means for controlling the current through at least one of said second and third valves for the purpose of varying the frequency of the oscillations supplied by the oscillator.

2. An electric oscillator according to claim 1 wherein means is provided for controlling the current through all the said valves for the purpose of varying the frequency of the oscillations supplied by the oscillator.

3. An electric oscillator according to claim 2 wherein means is provided for supplying a signal to the control grid of said first valve for the purpose of varying the frequency of the oscillations supplied by the oscillator.

4. An electric oscillator comprising first, second and third thermionic valves each having an anode, a cathode and a control grid, means to maintain the control grid of the second valve at a first predetermined potential, means to maintain the control grid of the third valve at a second predetermined potential, positive and negative supply lines, an electric path which connects said negative supply line to the cathode of said first valve and which presents a relatively low impedance at the frequency of operation of the oscillator, a direct electrical connection between the anode of said first valve and the cathode of said second valve, a direct electrical connection between the anode of said second valve and the cathode of said third valve, a purely resistive impedance connected directly between the anode of said third valve and said positive supply line, a capacitive coupling between the anode of said third valve and the grid of said first valve which coupling completes a closed loop that includes the series-connected anode-cathode discharge paths of all said valves so that during operation the cumulative phase-shift around the loop at the frequency of operation is such that the combination is self oscillatory, and means for controlling the current through at least said second and third valves for the purpose of varying the frequency of the oscillations supplied by the oscillator.

References Cited in the file of this patent

UNITED STATES PATENTS 2,006,872 Nyman ---------------- July 2, 1935